Feb. 24, 1970     B. FISHER     3,497,138
INTERROGATOR-ENCODER MECHANISM
Filed Sept. 27, 1965     2 Sheets-Sheet 1
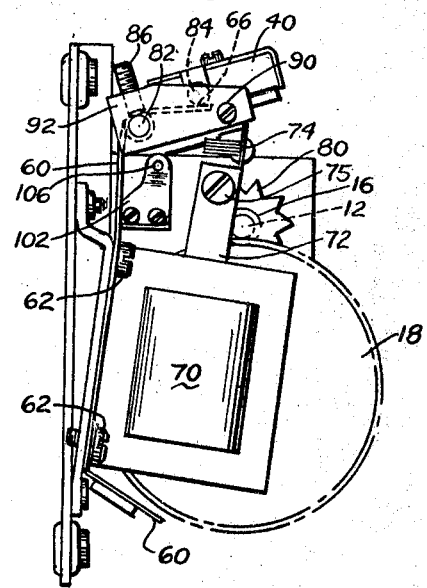
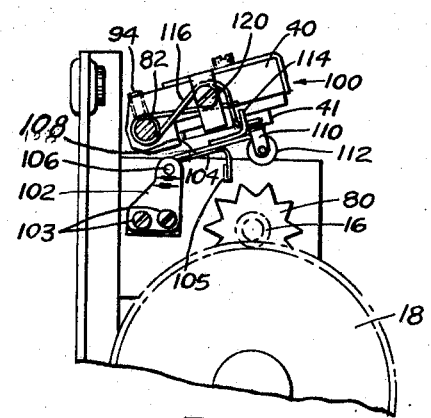
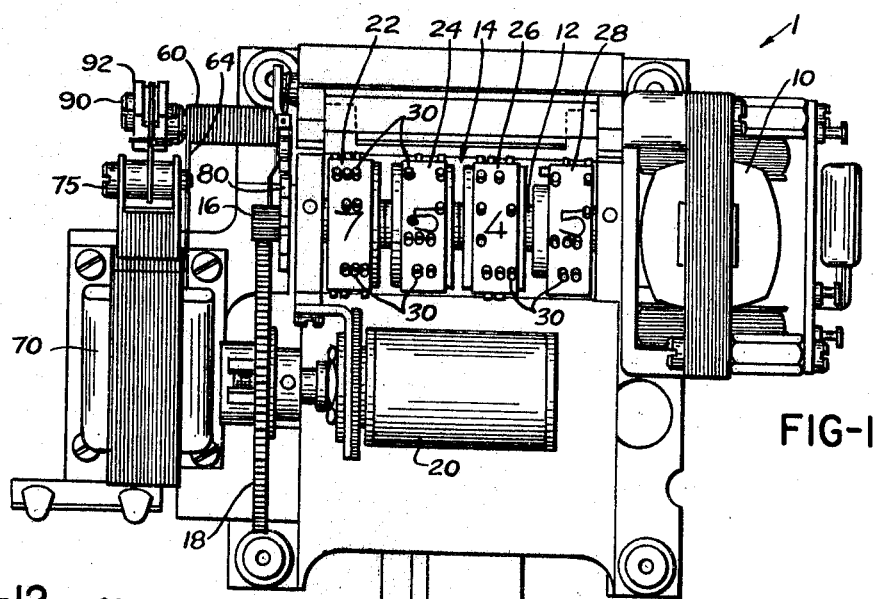
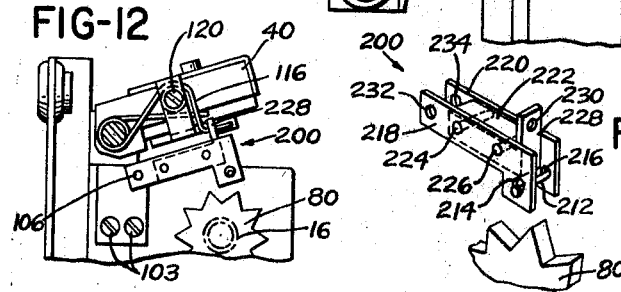
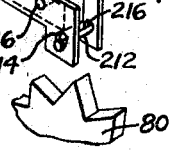
INVENTOR.
BERNARD FISHER
BY *Walter F. Gilbert*
ATTORNEY

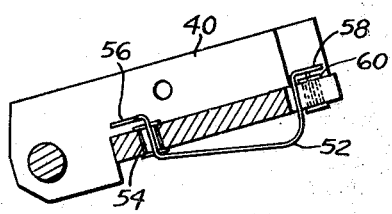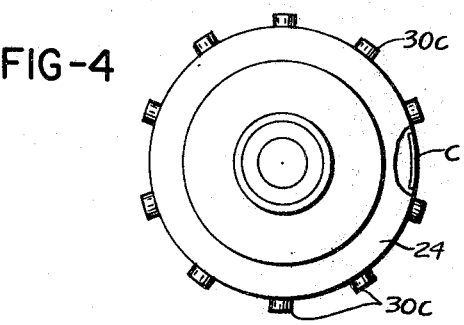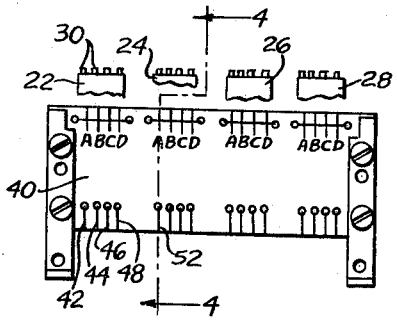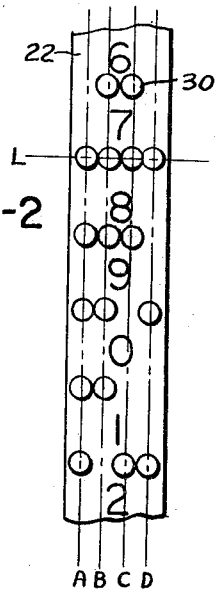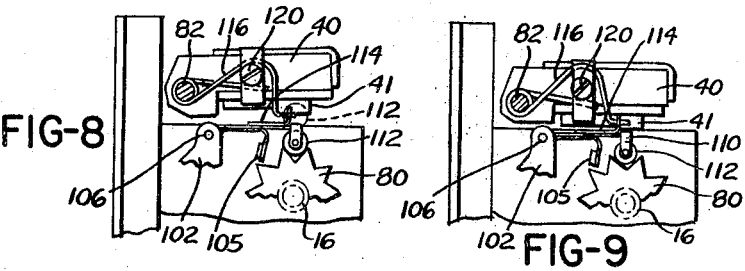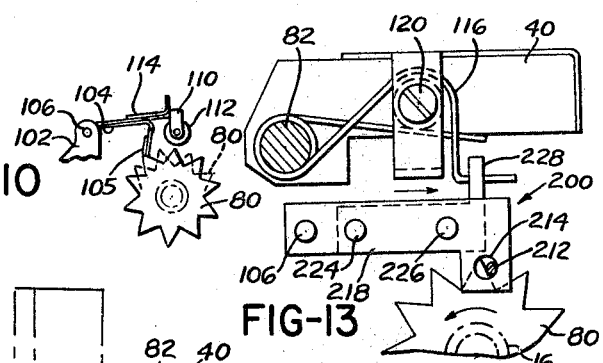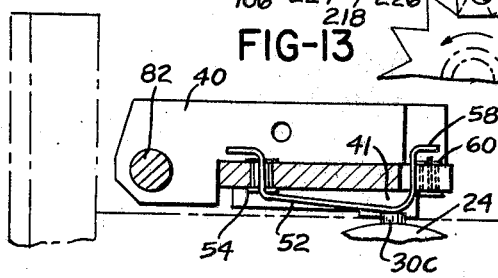
INVENTOR.
BERNARD FISHER
ATTORNEY United States Patent Office 3,497,138
Patented Feb. 24, 1970

3,497,138
INTERROGATOR-ENCODER MECHANISM
Bernard Fisher, Trotwood, Ohio, assignor, by mesne assignments, to United Systems Corporation, Dayton, Ohio, a corporation of Delaware
Filed Sept. 27, 1965, Ser. No. 490,581
Int. Cl. G06c 23/00, 27/00
U.S. Cl. 235—61                    10 Claims

ABSTRACT OF THE DISCLOSURE

An encoder for converting a digital meter reading into a mechanical code representative of such reading in which a wheel having indicia thereon also has a series of pins located on the peripheral surface thereof. A switch board is provided to be brought into contacting position with the pins whenever the code is to be read or interrogate, which board carries a series of switch actuators which either are positioned by the pins or not actuated. In another aspect of the invention prior to the interrogation function a justifying function is accomplished by mounting on the swtich board a roller or pin detent which is lowered to justify the position of the wheel by contacting a toothed element thereon and, if necessary, slightly rotating the wheel to line up the pins with the switch actuators as described.

---

This invenion relates to an interrogator-encoder mechanism for use with a digital presentation device, and more particularly for use with a digital signal creating meter for measuring volts, amperes, resistance, etc.

Digital meters of the type with which this invention is concerned are those such as shown in the copending application for U.S. Patent, Ser. No. 250,302, filed Jan. 9, 1963, entitled "Digital Meter," by Jule Hulman and Bernard Fisher, now Patent No. 3,350,639. In such meters a series of counter wheels are driven by a motor to visually display the reading of the meter. It is desirable in such devices to provide an output signal representative of this meter reading, or even to provide an output signal instead of such visual reading if desired. This output signal can be used to actuate a printer unit to provide a written display, or it can be employed to punch cards, activate a computer, etc.

It is therefore one object of the invention to provide an encoding device for converting a digital meter reading into a mechanical code representative of such reading. It is a further object of the invention to provide an encoding means in conjunction with counter wheels of a digital meter. It is a still further object of the invention to provide a means for periodically and at command interrogating the counter wheel position of a digital meter and creating an electrical signal representative of such position. Another object of the invention is to provide an interrogator-encoder means for a digital reading meter which unfailingly will provide readings of the counter wheel position of the meter. A further object of the invention is to provide a means for centering a cam wheel prior to positioning an element coordinated with said cam wheel. These and other objects of the invention will become more readily apparent upon a reading of the description following hereinafter and upon an examination of the drawings, in which:

FIG. 1 is a cross sectional view through a portion of a digital meter indicating the coded counter wheels of the invention;

FIG. 2 indicates in plan view a portion of the coded surface of a counter wheel of the digital meter of FIG. 1;

FIG. 3 is a top view of a switch board assembly for use in interrogating the encoded counter wheel reading of the digital meter;

FIG. 4 is a cross-sectional view taken along line 4—4 of FIG. 3;

FIG. 5 is a side view, partially in cross-section, indicating the interrogating position of the switch board assembly of FIG 3 in conjunction with an encoded counter wheel;

FIG. 6 is a side view of a portion of a digital meter indicating the actuating mechanism for moving the interrogator board of the invention;

FIG. 7 is a side view of still another portion of a digital meter indicating the pre-positioning means for the interrogator board of the invention which assures proper spatial relationship with the encoded counter wheels;

FIG. 8 is a side view similar to FIG. 7 showing the position of the parts after the pre-positioning action and prior to the interrogating function;

FIG. 9 is a side view similar to FIG. 7 but indicating the interrogation function and position of the parts;

FIG. 10 is a side view of the cam wheel and centering mechanism of the invention indicating the action of the cam pusher means;

FIG. 11 is a perspective view of a modification of the centering mechanism of the invention;

FIG. 12 is a side view similar to FIG. 7 but showing the modification of FIG. 11; and FIGS. 13 and 14 are side views similar to FIG. 12 but showing successive positions of the modified centering mechanism similar to FIGURES 8 and 9.

As shown in FIG. 1 the invention is employed in connection with a digital meter such as a voltmeter, wherein a coded electrical output is desired to be obtained, in addition to or instead of the readout display. This coded electrical output can then be employed to operate a printer, computer typewriter, etc. The meter 1 includes a motor 10 which has an output shaft 12 which is mechanically connected with a four wheel counter display, for example. The motor shaft 12 has a gear 16 mounted on the end thereof which serves to drive a reference signal potentiometer 20 by means of a gear 18. The servomotor 10 drives both the counter display 14 and the potentiometer 20 in a direction to cancel a difference voltage which then becomes zero, at which time the counter display 14 will present a reading in digital form; all as explained in greater detail in the aforementioned Patent No. 3,350,-639.

The mechanical counter wheel display 14 is converted to a coded electrical binary decimal output according to the invention by mechanically coding the wheels 22, 24, 26 and 28. To accomplish this each wheel has a series of pins 30 located on the outer periphery thereof. The pins are located between the printed numbers on the wheels so that they are not visible from the outside of the meter, but are available for interrogation, as is explained in more detail hereinafter. Although pins are shown, the code can be produced by protuberances of any desired configuration. Also, it is to be understood that any desirable code can be employed, although what is described hereinafter is a four bit code, i.e. 1–2–4–8 system.

Since a decade counter, i.e. tenths, is illustrated, each wheel is required to have numbers from 0 through 9. As is more clearly shown in FIG. 2, the pins 30 are arranged in four columns: A, B, C and D. In the arrangement shown the absence of a pin in a column defines the binary number 1. Thus, the absence of a pin in column A represents 1; in column B—2; in column C—4; and in column D—8. Thus a combination of pins in the columns can be attained representing any number from 1 to 15, if desired, although the device shown is a decade counter, as indicated. As shown in FIG. 2, in line L, the presence of all four pins will create a signal indicating the number "0" on the wheel 22. This is desirable because the pins serve to actuate switches, and the switches are arranged to break a circuit, so that the presence of four pins in line L will result in all four columnar switches being opened to signify the "0" condition. As is shown, the pins are located approximately 90° spaced from the actual numeral printed on the surface of the wheel 22. The pins could be located in any relationship, but the 90° one is shown since the window display of the meter is located 90° removed from the interrogator means discussed hereinafter.

As is shown in FIGURE 3, the wheels 22, 24, 26 and 28 are located opposed to a switch board 40. This board 40 has mounted thereon a series of wire elements such as 42, 44, 46 and 48 which serve to "read" the presence of pins in the columns A, B, C, and D of the wheel 22, for example. With reference to the cross-sectional view of FIG. 4 the wheel 24 has the pin 30c located opposite to the switch board 40. This pin 30c in column A of the wheel 24 forms a portion of the mechanical code for the character C printed on the wheel 24 and 90° removed from the pin. The switch wire 52 is arranged opposed to the pin 30c. This switch wire 52 is fixedly embedded in the electrically conductive ferrule 54, and the end thereof 56 is available for connection to leads which will transfer the "on-off" information of the switch to any device to which the information is to serve as an actuating means. The other end 58 of the wire 52 is normally in circuit making contact with a cross wire or bus bar 60. As is shown in FIG. 5 when the interrogating function is performed, the board 40 will be lowered so that the pin 30c will contact the wire 52 and lift its end 58 out of contact with the wire 60. As is readily understood the board 40 is of a non-conductive material as is the pin 30c.

The normal position of the board 40 is as shown in FIG. 4, i.e. in hinged up position, and the spring action of the wire 52 maintains the contact of the wire 52 with the cross wire 60. When the board is lowered the pin, if present, will serve to elevate the wire to open the circuit with the cross wire 60 to give the logic to the code. Therefore with the code chosen a series of switches respond in coincidence with the presence or absence of pins in each column, and effectively the pins serve as an encoded mechanical analog of the reading of the meter, with the board carrying the switches serving as an interrogator for the encoded signal, which converts this signal or reading into an electrical signal.

Since a shaft driven counter 14 is employed in the meter it is necessary that at the time of the interrogation function the position of the pins be discretely oriented, or else the switches will not be properly actuated. A justifying or centering means is provided to insure proper orientation of the pins with respect to the switches. One such justifying means is shown in FIGURES 6 through 10, and a second modified means is shown in FIGURES 11 through 14.

Referring now to the justifying means of FIGS. 6–10 it is seen that the shaft 12 has a star wheel 80 mounted at one end thereof with which a detent means cooperates, as explained hereinafter. The switch board 40 is urged to the upward position as shown in FIG. 6 by the spring 60. One end 64 of the spring 60 is captured underneath a solenoid 70. The latter is mounted by a series of screws 62 to the meter base. The other end 66 is wrapped around the switch board shaft 82 and underneath a stud 84. The spring 60 is clamped by the set-screw 86 to the shaft 82. In this manner the spring 60 serves to maintain the board 40 in raised position normally. The solenoid 70 serves to move the board 40 downward upon command. The plunger or armature 72 of the solenoid 70 has a pull down spring 74 mounted as by the screw 75 at the outer end thereof. The outer coil of the spring 74 is affixed to a stud 90 which is fastened to an actuating arm 92. This actuating arm 92 is fixed to the switch board hinge shaft 82 by the set-screw 86. In this manner when the solenoid is actuated to move the plunger 72 downward as viewed in FIG. 6 it will pull down the actuating arm 92 by a delay but soft or floating action through the pull down spring 74. Rotation of the actuating arm 92 about the hinge shaft 82 will also cause downward motion of the switch board 40.

As indicated above, in order for the switches on the switch board 40 to work properly, the shaft 12 must be in a properly oriented position. Referring to FIG. 7 there is shown the star wheel or cam 80 and a cam latch assembly 100. The latter comprises a positioning cam latch plate 102 which is appropriately fastened to the meter base by screws 103. The latch plate is provided with a pivot pin 106 at its upper end to which the latch arm 108 is rotatively assembled. Mounted to the latch arm 108 as by soldering are the cam pusher arm 104, the spring guide arm 114 and the bifurcated bracket 110 which carries the roller 112. The cam pusher arm 104 has its lower end reinforced by a plate 105 which is affixed to the arm. The spring guide arm 114 is provided with a hole through which one end of a positioner spring 116 passes. The positioner spring serves to cushion the action of the cam positioner and also acts to cushion the action of the switch board.

The positioner spring 116 is wrapped around the hinge shaft 82 with one end passing under and the other end then to create a time delay between the positioning in the proper orientation of the counter wheels carrying the actuating pins and the placing of the wire switches against passing over a stud 120. The cam latch assembly serves these pins.

FIGS. 8 and 9 indicate the normal action of the cam latch assembly. As shown in FIG. 8 in dotted position the roller 112 is normally positioned above the cam wheel 80. When the solenoid 70 is actuated to rotate the hinge shaft 82, the positioner spring 116 is rotated in the clockwise direction as viewed in FIG. 8 to position the roller between two teeth of the cam wheel 80. In this initial position slight rotational motion of the cam wheel 80 may be attained. Should there be any misorientation still extant the succeeding rotational motion of the hinge shaft 82 will cause the lower portion 41 of the switch board to physically contact the bifurcated bracket 110 (see FIGURE 9) to positively force the roller 112 downward into the space between the teeth on the cam wheel and clearly properly orient the counter wheels for interrogation.

However, even a roller wheel acting upon a star wheel may be so positioned as to hang up on the tip of the teeth of the wheel. The device of the invention provides means for failsafe operation. The cam pusher arm 104 and reinforcing plate 105 serve this function. In the orientation of the wheel 80 wherein the roller 112 would hang up (i.e. the dotted line position shown in FIGURE 10), the teeth of the wheel 80 are so arranged that the arm 104 will contact a tooth and move the star wheel 80 slightly prior to the time that the roller even contacts a tooth of the wheel. The arm 104 thus insures that the roller then will not hang up. The arm 104 is shown as in the form of a flat spring member and has a secondary motion. It moves very slightly to orient the wheel 80 and then is no longer in contact with the wheel as shown in FIGURE 8 or 9. The arm 104 therefore only starts the wheel moving far enough so that the point of the tooth is placed out of the path of motion of the roller 112.

The spring 116 and the spring action provided by the latch assembly 100 perform as overtravel springs, thereby eliminating the necessity for control of critical dimension. During the time that the encoded counter wheels are being interrogated the unit is locked by the latch assembly, i.e. the roller being positioned between the teeth of the star wheel, and the meter cannot take another reading.

A simpler construction which also positively avoids hanging up of the roller on the teeth of the wheel is illustrated by the modified latch assembly 200 of FIGURES 11 through 14. In this modification, instead of a roller, a floating pin 212 is employed which is captured within an oversize hole 214 and a hole 216 formed in L-shaped bracket members 218 and 220, respectively. A spacer block 222 is riveted or otherwise affixed as at 224 and 226 to the bracket members 218 and 220. The spacer block has an upstanding arm 228 which has the hole 230 formed in it to receive the positioner spring 116. This latch assembly 200 is pivotally mounted to the pivot pin 106 which is received in the holes 232 and 234 formed in the bracket members 218 and 220, respectively. The mounting of this latch assembly 200 is clearly shown in FIG. 12 wherein the spring 116 passes through the hole in the arm 228.

The operation of the latch assembly is clearly shown in FIGS. 13 and 14. When the hinge shaft 82 is rotated the latch assembly is rotated in the clockwise direction. The pin 212 being of small diameter and arranged in the floating construction described, will not hang up on the tip of a tooth of the wheel 80, but will roll down the tooth as shown in FIG. 13. Further motion of the latch assembly will bring the pin to the bottom of the space between the teeth of the cam wheel 80. Still further motion of the hinge shaft will cause physical contact of the underside of the switch board with the latch assembly as indicated above.

What has been described is a relatively simple yet highly accurate and durable interrogator-encoder mechanism which can operate at high speed. Substantially no wear on the mechanism occurs until the switch board is brought down to take a reading, selectively. When the board is in the up position there is no torque added to the counter shaft. The interrogator employs cross wire contacts which are normally closed and are opened upon contact with the coded pins on the counter wheels. Such an arrangement is very reliable since if the lift on the cross wire is not very great, only a very small movement, i.e. 1/1000th of an inch, is necessary to break the circuit. If the device operated as a circuit making device then an opening far greater than this minimal distance would have to be maintained and this would be very difficult. In the device of the invention a controlled lift is attained which permits substantial overtravel without straining the parts.

What I claim is:

1. Justifying means for a shaft having operative parts positioned thereby, said shaft being provided with means affixed thereto for rotating same in a driving mode to a stop position, said justifying means operating upon said rotating means upon command to preposition said shaft into a desired orientation, the justifying means comprising an actuating element mounted so as to provide a predetermined time delayed motion and located above and normally out of contact with said rotating means but actuable upon a single command to contact said rotating means following movement of said shaft in the driving mode to the stop position to cause slight additional rotational movement of said rotating means in a justifying mode and permitting overtravel of the parts of the justifying means without imposing substantial strain thereon.

2. Justifying means of claim 1 wherein said rotating means comprises a toothed element and said justifying means comprises an actuating arm carrying a rolling detent of less diameter than the pitch of said teeth and normally out of contact therewith which is adapted to contact said toothed element to rotate same to properly orient said shaft into a desired position upon said command.

3. The justifying means of claim 2 wherein said actuating arm carries a second fixed arm so arranged as to contact the toothed element when necessary to avoid hanging up of the rolling detent on the tip of a tooth of said toothed element.

4. The justifying means of claim 1 wherein said rotating means comprises a toothed element and said justifying means comprises an actuating arm carrying a floatingly mounted pin detent which is adapted to contact said toothed element to rotate same to properly orient said shaft into a desired position.

5. An interrogator-encoder mechanism comprising, in combination:
   a plurality of mechanically coded wheels arranged to be driven;
   switch means including switch contact elements adapted to be positioned adjacent said coded wheels but normally out of contact therewith and to have the switch contact elements operated thereby in an interrogating function;
   justifying means mounted on a portion of said switch means for properly orienting said coded wheels immediately prior to the interrogating function, said justifying means and said switch means being mounted in such manner as to require mechanical coordination therebetween in their operation;
   and operating means mechanically interconnected to said switch means and said justifying means and actuable upon a single command for sequentially actuating said justifying means and immediately thereafter positioning said switch contact elements in interrogating orientation.

6. The interrogator-encoder of claim 5 wherein said coded wheels have visible digits thereon and are each provided with a series of pins located on the outer periphery thereof and so oriented and arranged as to represent in coded form the said digits;
   and the switch means comprises a member having a series of wire contacts thereon, each such contact being normally closed and arranged to be undisturbed or opened by the presence or absence of a pin juxtaposed thereto upon being placed in interrogating orientation upon said coded wheels, wherein logic of said code is imparted to said switch means.

7. The interrogator-encoder of claim 5 wherein said wheels are mounted upon a shaft provided with means affixed thereto for rotating same, said rotating means comprising a toothed element and said justifying means comprising an actauting arm carrying a rolling detent which is adapted to contact said toothed element to rotate same when necessary to properly preposition said shaft prior to interrogation read out; said justifying means operating upon said rotating means to preposition said wheel shaft and lock same in justified position prior to read out.

8. The interrogator-encoder of claim 7 wherein said actuating arm carries a second fixed arm so arranged as to contact the toothed element when necessary to avoid hanging up of the rolling detent on the tip of a tooth of said toothed element.

9. The interrogator-encoder of claim 5 wherein said wheels are mounted upon a shaft provided with means affixed thereto for rotating same, said rotating means comprising a toothed element and said justifying means comprising an actuating arm carrying a floatingly mounted pin detent which is adapted to contact said toothed element to rotate same when necessary to properly position said shaft prior to interrogation; said justifying means operating upon said rotating means to preposition said wheel shaft and lock same in justified position prior to read out.

10. The interrogator-encoder of claim 5 wherein said wheels are mounted upon a shaft provided with means affixed thereto for rotating same; said justifying means including spring means providing for overtravel of said justifying means and cushioning of the operating parts thereof, and operating upon said rotating means to preposition said wheel shaft and lock same in justified position prior to read out.

References Cited

UNITED STATES PATENTS

| | | | |
|---|---|---|---|
| 2,302,769 | 11/1942 | Haselton et al. | 235—61 |
| 2,894,683 | 7/1959 | Davis | 235—61 |
| 3,045,903 | 7/1962 | Fleming | 235—1 |
| 3,147,630 | 9/1964 | Sperber et al. | 74—10.15 |
| 2,895,121 | 7/1959 | Bliss | 235—61 |

FOREIGN PATENTS 838,970  6/1960  Great Britain.

RICHARD B. WILKINSON, Primary Examiner

STANLEY A. WAL, Assistant Examiner

U.S. Cl. X.R.

74—10.15